United States Patent
Nilsson et al.

(10) Patent No.: US 10,834,605 B2
(45) Date of Patent: Nov. 10, 2020

(54) DETECTING SUBFRAME TIMING IN AN OFDM LICENSED-ASSISTED ACCESS SIGNAL

(71) Applicant: Telefonaktiebolaget LM Ericsson (publ), Stockholm (SE)

(72) Inventors: Thomas Nilsson, Malmö (SE); Dzevdan Kapetanovic, Lund (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 124 days.

(21) Appl. No.: 16/326,621

(22) PCT Filed: Aug. 22, 2016

(86) PCT No.: PCT/EP2016/069834
§ 371 (c)(1),
(2) Date: Feb. 19, 2019

(87) PCT Pub. No.: WO2018/036611
PCT Pub. Date: Mar. 1, 2018

(65) Prior Publication Data
US 2020/0084635 A1    Mar. 12, 2020

(51) Int. Cl.
*H04W 16/14* (2009.01)
*H04L 27/26* (2006.01)
*H04W 74/08* (2009.01)

(52) U.S. Cl.
CPC ......... *H04W 16/14* (2013.01); *H04L 27/2607* (2013.01); *H04L 27/2662* (2013.01); *H04L 27/2675* (2013.01); *H04W 74/0808* (2013.01)

(58) Field of Classification Search
CPC .............. H04W 16/14; H04W 74/0808; H04L 27/2607; H04L 27/2662; H04L 27/2675
See application file for complete search history.

(56) References Cited

U.S. PATENT DOCUMENTS

| 8,411,807 B1 | 4/2013 | Rangarajan et al. |
| 2015/0208253 A1* | 7/2015 | Kim ...................... H04W 24/02 370/252 |

(Continued)

FOREIGN PATENT DOCUMENTS

WO    2014064322 A1    5/2014

OTHER PUBLICATIONS

Cano, Cristina, et al., "Fair Coexistence of Scheduled and Random Access Wireless Networks: Unlicensed LTE/WiFi", arXiv:1605.00409, May 2, 2016, 1-14.

*Primary Examiner* — Siming Liu
(74) *Attorney, Agent, or Firm* — Murphy, Bilak & Homiller, PLLC (57) ABSTRACT

Determining timing of an OFDM signal comprises performing (610) an auto-correlation with a received signal, using a delay chosen to correspond to the duration of an OFDM symbol excluding the cyclic prefix, with the number of terms used in the summation in the correlation is at least as large as the smallest number of samples in any cyclic prefix of a subframe. Based on the auto-correlation, first and second correlation peaks meeting one or more predetermined detection criteria are detected (620), and evaluated to determine (630) that they are separated in time by an interval corresponding to an OFDM symbol interval. The method further comprises identifying (640), based on the two correlation peaks, one of the correlation peaks as corresponding to an OFDM symbol having a larger cyclic prefix than an adjacent OFDM symbol, and determining (650) a subframe and/or slot timing for the received signal, based on said identifying.

20 Claims, 6 Drawing Sheets

(56) References Cited

U.S. PATENT DOCUMENTS

2016/0135080 A1 5/2016 Pazhyannur et al.
2016/0142920 A1 5/2016 Suzuki et al.

\* cited by examiner

DETECTING SUBFRAME TIMING IN AN OFDM LICENSED-ASSISTED ACCESS SIGNAL

FIELD OF INVENTION

The present disclosure is directed to techniques for determining subframe and/or slot timing in an Orthogonal Frequency-Division Multiplexing (OFDM) signal comprising a series of subframes.

BACKGROUND

An ever increasing demand for more frequency spectrum in the cellular world has recently turned the attention to the unlicensed bands, such as those commonly used for wireless local-area network (WLAN) operation. Given the large amount of spectrum available in the unlicensed bands, the capacity in wireless systems based on the Long-Term Evolution (LTE) standards could potentially be increased. However, use of the unlicensed bands comes with the additional costs of managing interference and coexistence with other technologies. To ensure efficient and smooth operation of cellular devices in unlicensed bands, these interference and coexistence issues must be studied and resolved in a standardization body like the $3^{rd}$ Generation Partnership Project (3GPP), which develops and promulgates standards for cellular wireless networks.

To address the use of unlicensed bands, 3GPP is developing a so-called Licensed-Assisted Access (LAA) framework. The LAA framework builds on the carrier-aggregation solutions introduced in Release 10 of the specifications for the Long-Term Evolution (LTE) wireless networks, adapting these carrier-aggregation techniques to access the additional bandwidth in unlicensed bands. More particularly, the LAA solution allows an eNodeB (3GPP terminology for a base station in an LTE system) to use and configure a secondary cell (SCell) operating in an unlicensed band. This SCell is referred to as an LAA carrier. With this arrangement, for example, the primary cell (PCell) is used to carry more critical real-time traffic and control information, while the LAA carrier is used to increase the link capacity for less sensitive data, e.g., data handled according to a "best effort" criterion.

A key challenge with using the unlicensed bands for the LAA carrier is the need to coexist with other technologies operating the same band. The major technology used in unlicensed bands today is the Wi-Fi standard IEEE 802.11, and all its variants. The traditional method used by 802.11 devices to coexist and share the spectrum is a technique referred to as Carrier-Sense Multiple Access with Collision Avoidance (CSMA/CA). Devices following this scheme use carrier sensing to detect other transmissions in the band of concern, and, in response to detecting another transmission, perform back off procedures to defer transmissions until the channel is found idle. This technique may also be referred to as a Listen Before Talk (LBT) scheme.

The specific method of listening to the channel described in IEEE 802.11 is called Clear Channel Assessment (CCA). Two modes of carrier sensing in 802.11 exist: physical and virtual carrier sensing. Physical carrier sensing involves energy detection, while virtual carrier sensing utilizes preamble detection. The duration of a Wi-Fi transmission is set in the duration field in the preamble of every packet, and this value is used by a receiving device to set the so-called Network Allocation Vector (NAV). The NAV is an indicator, as a counter, for how long the device must defer from accessing the medium. The NAV, when set, indicates to the device that the medium is occupied by a transmission. There is no need for the device to perform carrier sensing or energy detect when the NAV is set, and power consumption of the device can be saved by turning off parts of the device's radio circuitry.

In Release 13 of the 3GPP standards, four LBT priority classes have been defined, for downlink-only LAA, so as to meet different quality-of-service (QoS) requirements. Each class has a different set of LBT parameters, such as the minimum and maximum contention windows. Another important parameter is the maximum channel occupancy time (MCOT), which has a range from 2 to 10 milliseconds. A transmission burst from an LAA transmitter will last for multiples of 1 millisecond, depending on the priority class. A number of subframes of duration 1 millisecond will be transmitted in each burst.

Figure 1:
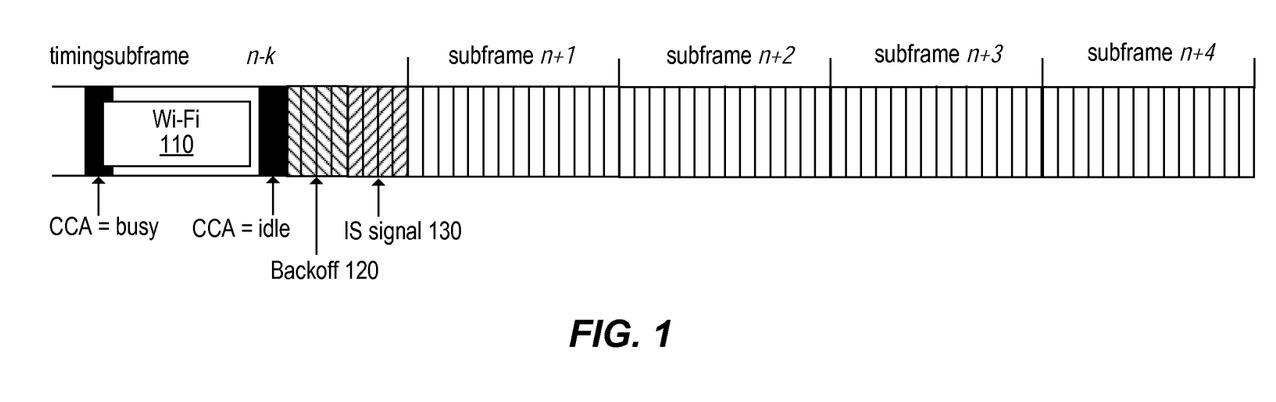
FIG. 1 shows a scenario where a Wi-Fi transmission interrupts a clear-channel assessment (CCA) process, resulting in a back-off period followed by the transmission of an Initial Signal (IS).

One problem that arises with the use of unlicensed spectrum for transmitting synchronized time-division multiplexed signals, such as an OFDM signal comprising subframes formatted according to the LTE standards, is the need, upon determining that an unlicensed frequency band is available for use, for the LAA transmitter to transmit a so-called Initial Signal (IS) to occupy the channel until the next subframe boundary. This signal is illustrated in FIG. 1, which illustrates a scenario where a Wi-Fi transmission 110 interrupts the clear-channel assessment (CCA), resulting in a back-off period 120. Because the CCA indicates that the channel is idle when the back-off period 120 is completed, an IS 130 is transmitted, effectively "reserving" the channel until the next subframe begins, at which time one or more subframes of data may be transmitted. The IS 130 may contain reference signals to help a receiving UEs, for example, to adjust receiver parameters. The IS may further contain useful system information if it is transmitted by the eNB.

Another problem with the coexistence between Wi-Fi and LAA is that the preamble detection traditionally performed by Wi-Fi devices is difficult when the technologies have completely different physical layer parameters. To save power in a Wi-Fi device it is crucial that the device can go to sleep and turn off parts of the radio, as frequently as possible. One feature in Wi-Fi that facilitates this is the virtual carrier sensing discussed above. After detecting a correct preamble, the device can read out the duration of the current transmission. This allows the device to know when to enter sleep mode, without having to perform energy detect during the whole transmission.

The document US2016142920 discusses such a technique.

A problem with the coexistence between LAA and Wi-Fi is that preamble detection is not straightforward and simple, while the energy-detect approach to determining whether a channel is occupied will be costly, from a power consumption point of view.

SUMMARY

The techniques and apparatus described herein include a method for an OFDM device to detect the presence of signal from another OFDM system, such as for a Wi-Fi device to detect an LAA/LTE signal or a New Radio (NR) (5G) signal, in the time domain, and to find the corresponding subframe and/or slot timing for the signal. This information may then be used by the Wi-Fi device to set a timer for regulating sleep mode, e.g., by setting the NAV value.

An example method may be implemented in a receiver, and is for detecting the presence and timing of a subframe and/or slot of an Orthogonal Frequency-Division Multiplexing (OFDM) signal comprising subframes and/or slots, each subframe and/or slot consisting of a plurality of OFDM symbols, with at least one OFDM symbol in each subframe and/or slot having a different cyclic prefix (CP) duration from remaining OFDM symbols in the subframe. The example method comprises performing an auto-correlation of a first set of time domain samples of a received signal with a second set of time domain samples of the received signal, the second set of samples being a delayed version of the first set of samples. The delay is chosen to correspond to the duration of the OFDM symbol excluding the CP, and the number of terms used in the summation in the correlation is at least as large as the smallest number of samples in a CP in any of the OFDM symbols within a subframe.

The method further comprises detecting, based on the auto-correlation, first and second correlation peaks meeting one or more predetermined detection criteria, and determining that the first and second correlation peaks are separated in time by an interval corresponding to an OFDM symbol interval. The method still further comprises identifying, based on the two correlation peaks, one of the correlation peaks as corresponding to an OFDM symbol having a larger cyclic prefix than an adjacent OFDM symbol, and determining a subframe and/or slot timing for the received signal, based on said identifying. In some embodiments, the subframe and/or slot timing may be used to set a sleep timer that regulates a sleep mode for the receiver.

Corresponding apparatuses are also detailed herein. An example receiver according to some embodiments includes radio-frequency circuitry configured to receive and condition a received radio-frequency signal, and an analog-to-digital converter circuit configured to sample the conditioned radio frequency signal, thereby generating time-domain samples of the received signal. The example receiver further includes a processing circuit configured to perform an auto-correlation of a first set of the time-domain samples with a second set of the time-domain samples. Again, the second set of time-domain samples is a delayed version of the first set of time-domain samples; the delay is chosen to correspond to the duration of the OFDM symbol excluding the CP. Again, the number of terms used in the summation in the correlation is at least as large as the smallest number of samples in a CP in any of the OFDM symbols within a subframe.

The processing circuit is further configured to detect, based on the auto-correlation, first and second correlation peaks meeting one or more predetermined detection criteria, and determine that the first and second correlation peaks are separated in time by an interval corresponding to an OFDM symbol interval. The processing circuit is still further configured to identify, based on the two correlation peaks, one of the correlation peaks as corresponding to an OFDM symbol having a larger cyclic prefix than an adjacent OFDM symbol, and determine a subframe and/or slot timing for the received signal, based on said identifying. In some embodiments, the processing circuit is further configured to use the subframe and/or slot timing to set a sleep timer that regulates a sleep mode for the receiver.

The techniques described herein allow Wi-Fi devices to save power when coexisting with LAA devices. The described techniques have low complexity, while requiring some buffering of samples. Other advantages of the disclosed techniques, as well as other embodiments and variants of the above-summarized embodiments, are discussed in the detailed description below.

BRIEF DESCRIPTION OF THE FIGURES

FIG. 4A illustrates components an example transmitter circuit, while

DETAILED DESCRIPTION

According to some of the techniques disclosed herein, a wireless device, such as a Wi-Fi device, detects a LTE/LAA transmission by making use of the structure of the OFDM symbol. An OFDM symbol with a cyclic prefix contains redundancy that can be exploited by an autocorrelation approach to find the symbol timing. In the techniques described herein, this OFDM symbol structure and certain characteristics of the subframe structure, where a subframe consists of multiple consecutive OFDM symbols, are exploited to detect the presence of an LAA transmission by a node in a cellular system, and to determine the timing of the subframe. In other words, these techniques can be used to not only detect that an LAA transmission is present, but to also determine where the LAA subframe boundaries are, relative to the detected OFDM symbol. Because this can be done without receiving an entire subframe of the received signal, these techniques enable the device to take full advantage of opportunities to "sleep," i.e., to power down radio circuitry for as much time as possible.

It will be appreciated, however, in view of the following detailed discussion, that this approach requires that a part of the cyclic prefix remains intact. Thus, the technique's performance will decrease for increasing lengths of the channel's impulse response. It should also be noted that while the techniques detailed below are described in the context of detecting an LTE transmission, these techniques are more generally applicable to the detection of OFDM signals having a subframe- or frame-based structure, where at least one of the OFDM symbols in a subframe or frame has a cyclic prefix duration that differs from that of an adjacent OFDM symbol. Thus, the techniques described herein may be applied to the detection of 5G signals, or other OFDM signals having a subframe-based, slot-based, and/or frame-based structure where the cyclic prefixes for OFDM symbols vary in a predictable pattern. Examples include, for example, signals transmitted according to the specifications for a "Next Generation" (NG) or "New Radio" (NR) system, which are currently under development. Further, while the techniques discussed herein are described in the context of a Wi-Fi device carrying out the detection techniques, the techniques may be implemented in any wireless device that has a need to detect the presence of an OFDM signal having a structure similar to those described here.

Figure 2:
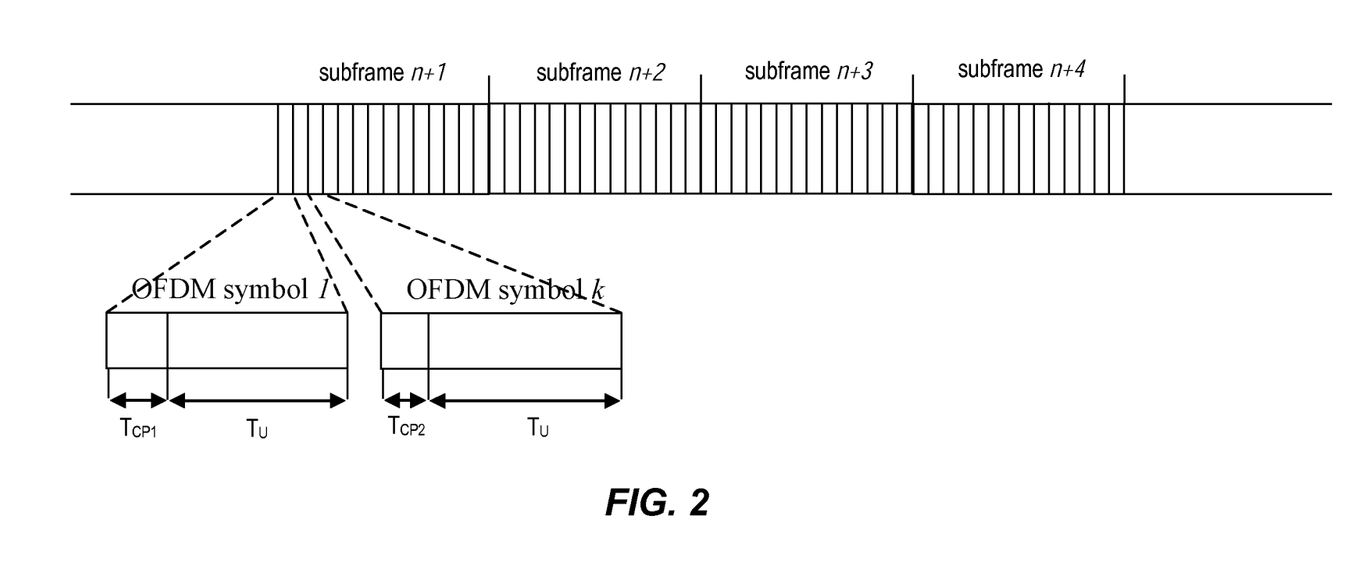
FIG. 2 shows the time-domain structure of an OFDM signal.

FIG. 2 illustrates the time domain structure for an LTE signal. As seen at the top of the figure, the signal comprises a series of subframes, referenced in the figure as subframes n+1, n+2, n+3, etc. Each of these subframes consists of a series of OFDM symbols; in an LTE subframe using a "normal" cyclic prefix, there are 14 OFDM symbols per subframe.

As shown at the bottom of the figure, the first OFDM symbol in each subframe of the illustrated signal has a slightly longer cyclic prefix ($T_{CP1}$) than the rest of the symbols ($T_{CP2}$). As is well known, the last part of each OFDM symbol is identical to the cyclic prefix in the beginning of the symbol. In other words, the final portion of the OFDM symbol is copied and prefixed to the beginning of the symbol. Thus, in the OFDM symbol k shown in FIG. 2, the final portion ($T_U$–$T_{CP2}$) of the OFDM symbol is identical to the cyclic prefix in the beginning of the symbol. Note that the cyclic prefix is sometimes referred to as a "guard interval," as it provides a separation between symbols to allow inter-symbol interference between adjacent symbols to be discarded. It is the repetition aspect of the cyclic prefix that is exploited in the presently disclosed techniques, however.

As a result of this OFDM symbol structure, an autocorrelation between two copies of the same signal, where one of the signal copies is delayed with $T_U$, will result in a peak. $T_U$ is the duration of the OFDM symbol excluding the CP, or the useful (for data) part of the symbol. If the length of the OFDM symbols is already known, as is the case with symbols in an LTE signal, the autocorrelation can be applied to the received signal and peaks will be found separated by distances corresponding to the total length of the OFDM symbol, i.e., the duration of the CP plus the duration $T_U$ of the "data" portion of the OFDM symbol.

The same approach, but with a shorter size of $T_U$, can be used in Wi-Fi to acquire synchronization. If it is known that a received signal is OFDM modulated, then it is possible to use the correlation approaches to know if it is of type Wi-Fi, LTE or any other OFDM-based standard with a specific symbol length. Conventionally, a Wi-Fi device trying to determine whether a channel is occupied first tries to decode a preamble from the received signal, where this attempted decoding assumes the presence of a Wi-Fi signal. If this preamble detection step fails, then the default behavior is to perform an energy detect procedure. While this energy detect procedure may detect that the channel is occupied by a transmission, possibly from an LAA transmitter, it provides no information about the timing of the signal. This means that the device must keep monitoring the signal energy or attempting to perform preamble detection, until the channel is no longer occupied and can be used by the device for a transmission of its own.

According to various embodiments of the presently disclosed techniques, the correlation method described above is triggered, in the event that the above-described preamble detection fails. This correlation approach can be used to determine whether the received signal is of type LTE, in some embodiments, or of some other type having an OFDM structure.

If the correlation process briefly discussed above indicates that an LTE signal has been detected, then the Wi-Fi device can use the timing information derived from this process to set the NAV and sleep, e.g., for almost 1 millisecond, the duration of an LTE subframe. The device can perform a periodic short wake up, for each 1-millisecond interval corresponding to the LTE subframes, and perform the correlation again to see if the LTE signal is still present. If it is, then the device can go back to sleep for another 1 millisecond. If not, then the device is free to use the channel if it is not occupied by another Wi-Fi transmission, for example. It will be appreciated that in the presence of LAA transmissions, this technique allows the device to save power by not having to perform energy detection for several milliseconds.

In addition to simply detecting the presence of an LAA signal, such as an LTE signal, it is advantageous to identify the subframe timing of the signal, so that the sleep mode can be more efficiently utilized. One issue with identifying the exact subframe timing from the detection of a single OFDM symbol is that LAA transmitters can potentially use an Initial signal (IS) to reserve the channel until the next subframe boundary. The length of the IS is less than one subframe, and is not generally known to the receiving device. The same arises if the Wi-Fi device starts to listen to the channel in the middle of an ongoing LAA transmission. As detailed below, under favorable conditions it is possible to exploit the difference in lengths of the cyclic prefix between the first and the rest of the OFDM symbols in the subframe.

Figure 3:
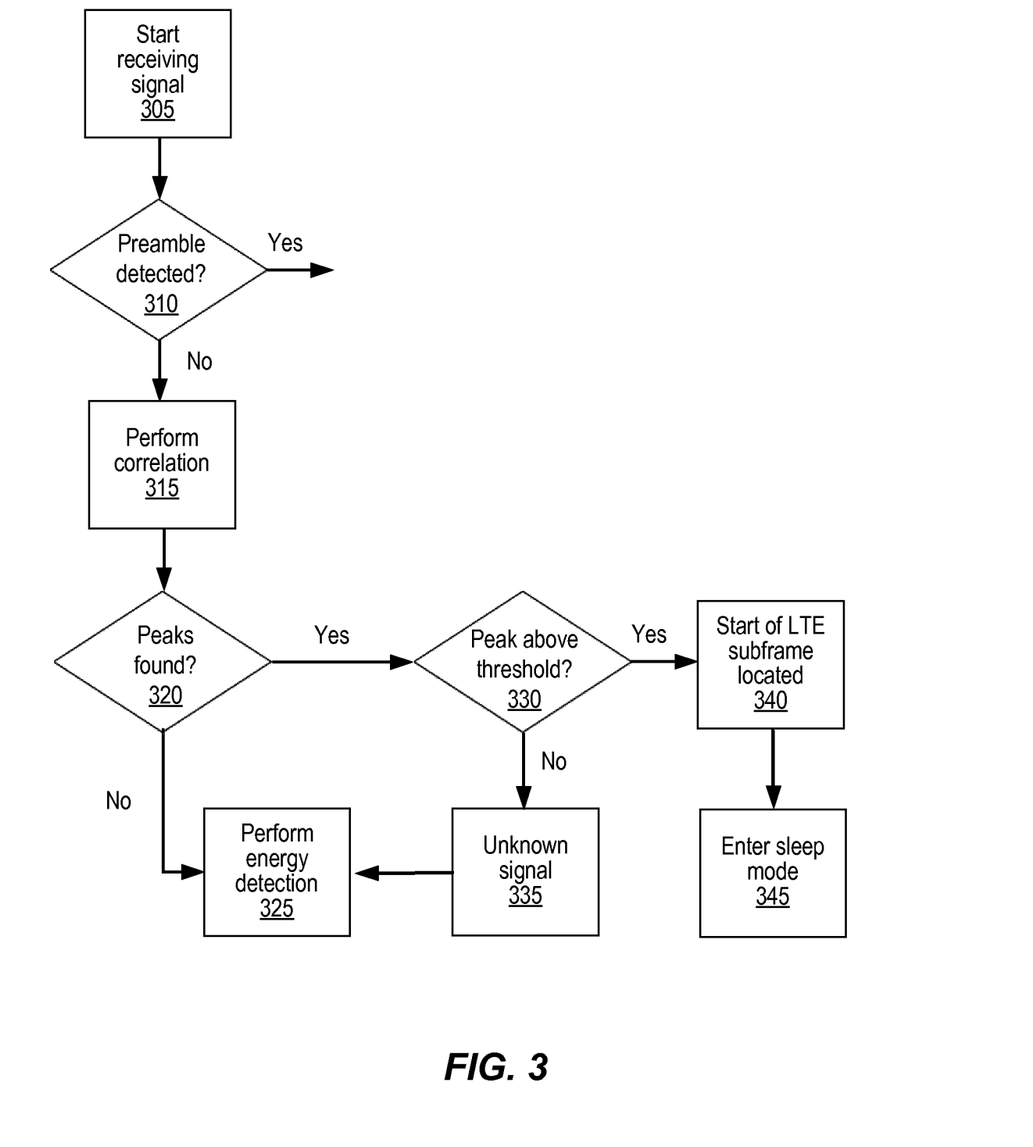
FIG. 3 illustrates an example process, as implemented by a wireless device.

FIG. 3 illustrates basic steps of an example algorithm, as might be implemented by a Wi-Fi device, for example. The illustrated process begins, as shown at block 305, with receiving a signal. This may be triggered, for example, by a need to transmit data in an unlicensed band that is used for Wi-Fi but that might also be used by a cellular network using LAA or a similar technique.

As shown at block 310, the illustrated process further includes determining whether a Wi-Fi preamble has been detected, using a conventional preamble technique. If yes, then the device can take action as it normally would, e.g., by determining the duration of the received transmission from a parameter included in the preamble.

If a Wi-Fi preamble is not detected, however, then an autocorrelation of the received signal is performed, as shown at block 315. Details of an example autocorrelation procedure are provided below. The output of the autocorrelation is analyzed, as shown at block 320, to determine whether peaks are found, indicating that an OFDM symbol of a known duration has been detected. This may include, for example, determining that the peaks are separated by a duration that corresponds to a known duration for an OFDM symbol for a particular type of transmission, e.g., a transmission according to the LTE subframe structure. This determination that the peaks are separated by an appropriate duration may be implicit in the design of the autocorrelation process itself, as will be seen when the autocorrelation process is discussed in more detail below.

If no peaks are found (no peaks are detected above the threshold), then energy detection may be performed to determine whether the channel is occupied by a transmission of an unknown type, using techniques that are conventional to Wi-Fi devices. This is shown at block 325. On the other hand, if peaks are detected, then the process continues with the determination of whether the peaks meet one or more amplitude criteria, e.g., whether they are above a predetermined threshold value. This is shown at block 330. If not, then it is assumed that the signal is of an unknown type, as shown at block 335; the energy detection process shown in block 325 may then be used.

If the peaks are above the threshold, however, then the timing of the OFDM symbol within the subframe of the known type is determined, as shown at block 340. This may be done in one of several ways. First, an OFDM symbol having a longer cyclic prefix than an adjacent symbol will produce a larger autocorrelation peak than the adjacent symbol. In an LTE subframe, for example, the cyclic prefix is roughly 9% longer in the first OFDM symbol, and this will give rise to a correspondingly larger autocorrelation peak. Thus, the amplitudes of two peaks separated by the length of an OFDM symbol can be compared to determine whether one is larger than the other, e.g., by at least a predetermined margin or ratio. If so, this indicates the timing for the OFDM symbol with the longer cyclic prefix. If it is known where this OFDM symbol fits within a subframe (which is clearly the case for LTE signals, for example), then the subframe timing is immediately derivable from this information.

Second, if one of the peaks corresponds to an OFDM symbol with a longer cyclic prefix than its neighbor, then the separation in time between the two peaks will differ, at least slightly, from the separation in time between two peaks for OFDM symbols with the same cyclic prefix duration. This can be seen by referring again to FIG. 2—because the peak corresponds to the center of the cyclic prefix, a peak corresponding to OFDM symbol 1 will be occur slightly later in time, relative to the beginning of the symbol, than the peak corresponding to OFDM symbol k, because of the different lengths of their respective cyclic prefixes. Accordingly, the timing between the two peaks can be assessed to identify an OFDM symbol with a longer cyclic prefix, relative to its neighbor. Again, given that it is known where an OFDM symbol of this type fits within the subframe structure, then the subframe timing is derivable from this information.

It will be appreciated that if there is more than one OFDM symbol with a longer cyclic prefix than its neighbor(s), then it may not be enough to perform the above analysis for a single OFDM symbol. For many possible OFDM subframe structures, detecting one (or more) additional OFDM symbols with a longer cyclic prefix than its neighbors can resolve any ambiguities, allowing for the subframe timing to identified.

Once the subframe timing is identified, e.g., when the starting position of the subframe is known, then this information can be exploited to regulate sleep mode. This is shown at block 345. Once the transmission of an LAA subframe (such as an LTE LAA subframe) in the unlicensed frequency band has been identified, and its timing known, the device can make assumptions about the expected duration of the transmission, and use those assumptions to drive its sleep behavior, i.e., to turn off certain radio circuitry intermittently, to save power. For example, when an LAA transmission having an LTE format is detected, the device can assume that the current 1-millisecond subframe will be completed, and use that information to set its sleep timer so that the radio circuitry is awakened to check for the next 1-millisecond subframe. For example, this timer can be set so that the receiver is awakened in time to perform the same autocorrelation procedure to detect, in the next subframe, the OFDM symbol having the longer cyclic prefix time. If this symbol is detected in this next subframe, the radio circuitry can again be put to sleep, until the following subframe. More generally, the sleep timer may be set so as to wake up the receiver at any predetermined offset in time, relative to the identified OFDM symbol having the larger cyclic prefix. For example, in situations where it is necessary to resolve a timing ambiguity, as discussed above, the sleep timer may instead be set so that the sleep duration is less than a subframe in length, so that an OFDM symbol within the same subframe can be detected, if present.

It should be understood that the autocorrelation processes and/or the timing analysis described above can be performed over several OFDM symbol durations and/or over several subframes, with the results appropriately combined, to acquire a more reliable result.

Autocorrelation processes and circuits for performing them are well known. Details of an example autocorrelation circuit are illustrated in FIG. 4B, as described below. It will be appreciated, however, that other configurations and details for the autocorrelation process are possible.

Figure 4A:
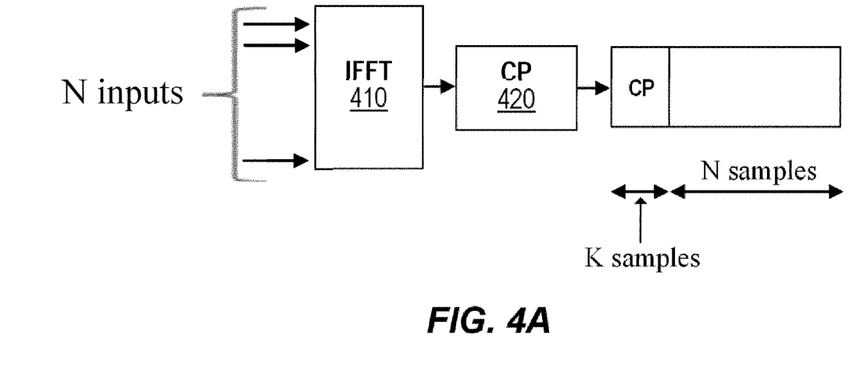
Figure 4B:
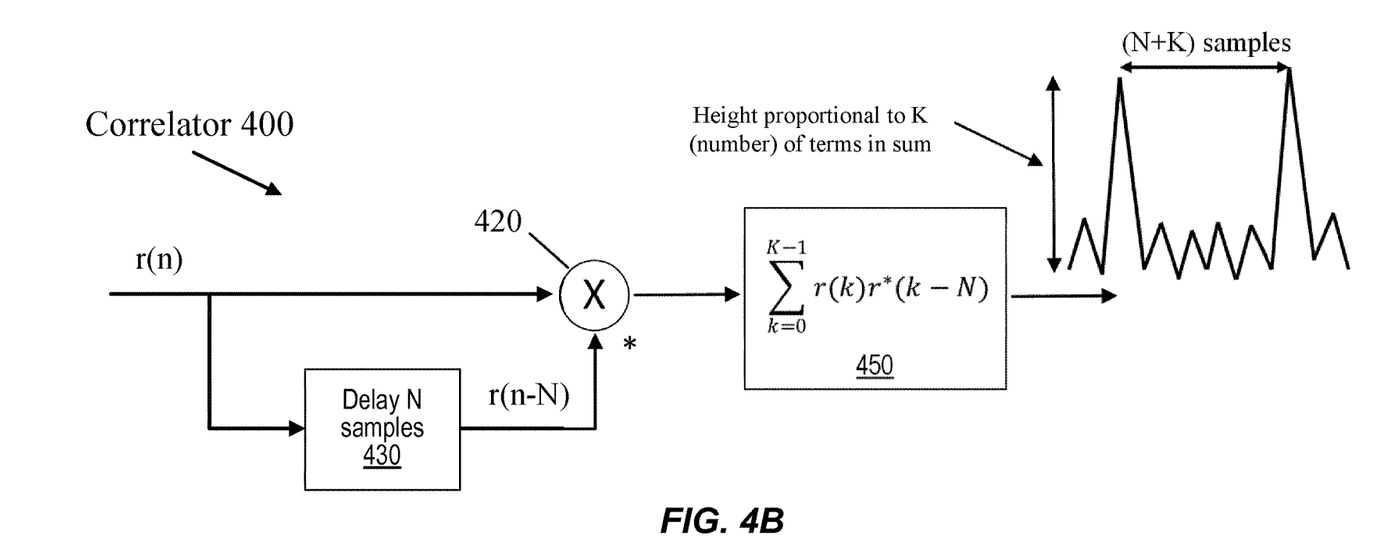
FIG. 4B illustrates details of an example correlator circuit.

First, FIG. 4A illustrates components of an example transmitter circuit, for generating an OFDM symbol from N data symbols. As shown in the figure, N data symbols at a time, each of which may be a complex-valued symbol according to any of several modulation constellations, for example, are supplied to an Inverse Fast-Fourier Transform module 410, of width N. The output of the IFFT module 410 is a serial stream of samples; these are taken N samples at a time and a cyclic prefix of length K is added in front, with a cyclic prefixing module 420. The length-K cyclic prefix for each OFDM sample is identical to the final K samples of the OFDM sample (i.e., the right-most K samples of the N samples from the IFFT module 410). The IFFT module 410 and cyclic prefixing module 420 may be implemented as digital logic, with a microprocessor executing software or firmware, and/or with a specialized digital signal processor (DSP), for example.

FIG. 4B illustrates details of an example correlator circuit 400, as might be implemented in a receiving wireless device, such as a Wi-Fi device. Each of the illustrated components of correlator circuit 400 may be implemented as digital logic, with a microprocessor executing software or firmware, and/or with a specialized DSP, for example. In the illustrated implementation, the input r(n) comprises a series of samples of the received signal. For the purposes of the present discussion it is assumed that the sample rate is such that there are N+K samples per OFDM symbol, but it will be appreciated that the techniques described herein may be easily adapted to an implementation in which the received signal is oversampled, e.g., at twice this rate.

One copy of the input r(n) is delayed, by N samples, in delay unit 410. The complex conjugate of the delayed samples is then formed, and multiplied, on a sample by sample basis, with the original input r(n), using multiplier 420. Finally, an autocorrelator 430 generates an autocorrelation result for each sample time, according to the formula:

$$\sum_{k=0}^{K-1} r(k)r^*(k-N).$$

K corresponds to the length, in samples, of the (expected) cyclic prefix in the received signal. As seen at the right side of FIG. 4B, if an OFDM signal with OFDM symbols of length N+K is present, with sufficient signal quality, the output of the autocorrelator 430 will have peaks separated by a distance of N+K samples.

As discussed in detail above, an OFDM signal may have symbols with differing cyclic prefix lengths. In the LTE and LTE-Advanced standards, two different values of K are used, for example. These may be designated K1 and K2, for instance, where K1>K2. A circuit like correlator circuit 400 can be used with the technique illustrated in FIG. 3 to perform autocorrelations on the received signal and determine whether a pair of peaks is present and separated by an expected distance, signifying the presence of an OFDM signal of a particular type, and then to determine whether one of the peaks corresponds to the longer one of K1 and K2. As discussed above, this can be done by evaluating and comparing the peak amplitudes, or by analyzing the precise distance between the peaks. A combination of both approaches can be used as well.

It will be appreciated that the correlator function shown in FIG. 4B has a length of K. Where there are two expected cyclic prefix lengths K1 and K2, where K1>K2, one approach is to set K to equal K1, to match the longer of the two cyclic prefix lengths. In this case, all of the samples of the longest cyclic prefix, when present, add constructively and contribute to the peak. When a shorter cyclic prefix is present, all of its K2 samples contribute to the peak, with the remaining K2−K1 tending to average out so as to add nothing to the mean. However, there will be a greater variance in the peak amplitude for the shorter cyclic prefixes, with this approach.

Alternatively, the correlator length can be set to K2, the shorter of the two lengths. In this case, the output of the correlator under good signal conditions will not be a sharp peak when the longer cyclic prefix is present, but will instead have a plateau. Still another approach is to run two correlators in parallel, with one set to a length of K1 and the other to a length of K2, and either analyze the results of both, to determine which provides the best peak, or combine the outputs.

Figure 5:
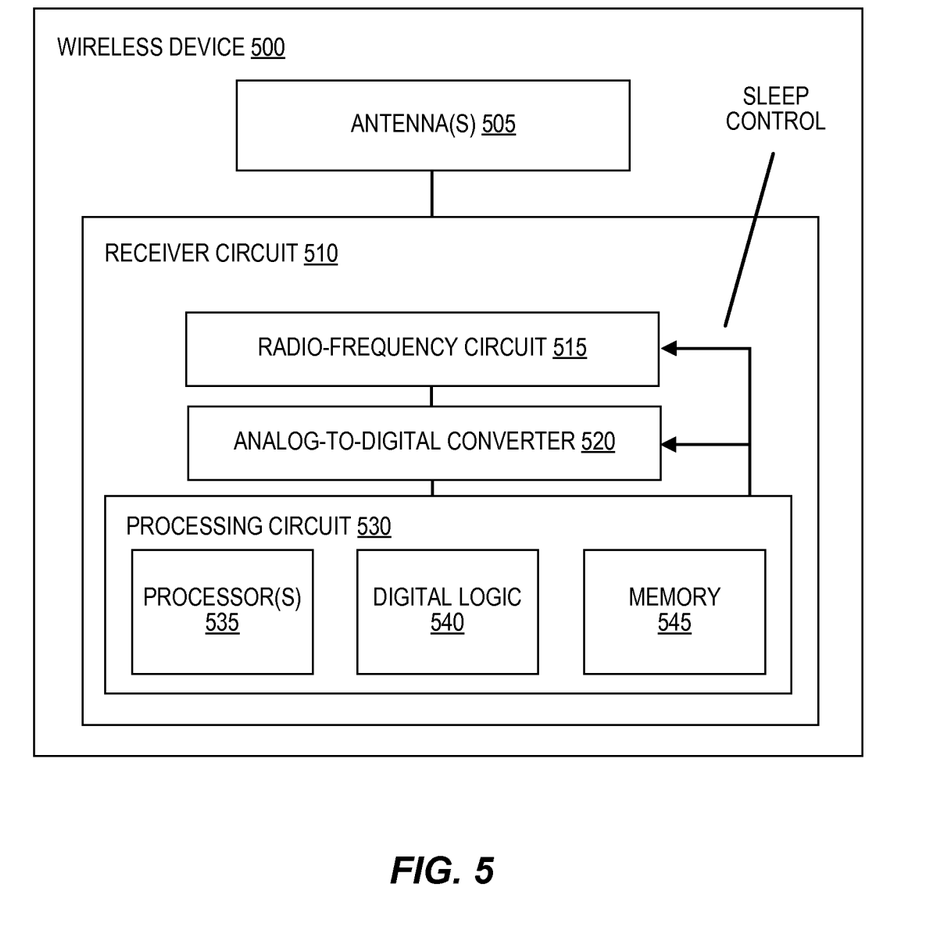
FIG. 5 is a block diagram illustrating components of an example wireless device.

The techniques described herein may be implemented in a wireless device, such as the wireless device 500 shown in FIG. 5, and more particularly in a receiver, such as in the receiver circuit 510 shown in FIG. 5. The wireless device may be a Wi-Fi device, for example, that uses the techniques described herein to identify the presence of an LAA signal, such as from an LTE transmitter, in an unlicensed frequency band, and to control a sleep mode of the device accordingly.

Wireless device 500 comprises one or more antennas 505 and a receiver circuit 510. Of course, a typical wireless device will also include transmitter circuitry, but an illustration of the transmitter circuitry is not necessary for a full explanation of the present techniques. Note, however, that some of the circuit components shown in FIG. 5 may be shared by receiver and transmitter functions, such as the antenna(s) 505, and/or portions of the receiver circuit 510.

Receiver circuit 510 includes a radio-frequency circuit 515, operatively coupled to the antenna(s) 505, and configured to condition the radio signals received via the antenna(s) 505. This conditioning typically includes filtering and amplification, and may include down-conversion. The receiver circuit 510 further comprises an analog-to-digital converter 520, for sampling the conditioned received signal. These samples are provided to processing circuit 530, which may include one or more programmable processors 535 (which may include one or more specialized digital signal processors, for example), digital logic 540, and memory 545. Memory 545 is configured to store, among other things, program code for execution by processor 535.

The processing steps detailed herein, such as those illustrated in FIGS. 3, 4A, 4B, and 6 (to be described below), are carried out in the receiver circuit 510. It will be appreciated by those skilled in the art of wireless receiver design that the various operations described herein may be partitioned between processor(s) 535 and digital logic 540 in many ways—in some embodiments, all of these operations may be carried out with processor(s) 535, without the need for customized digital logic.

Figure 6:
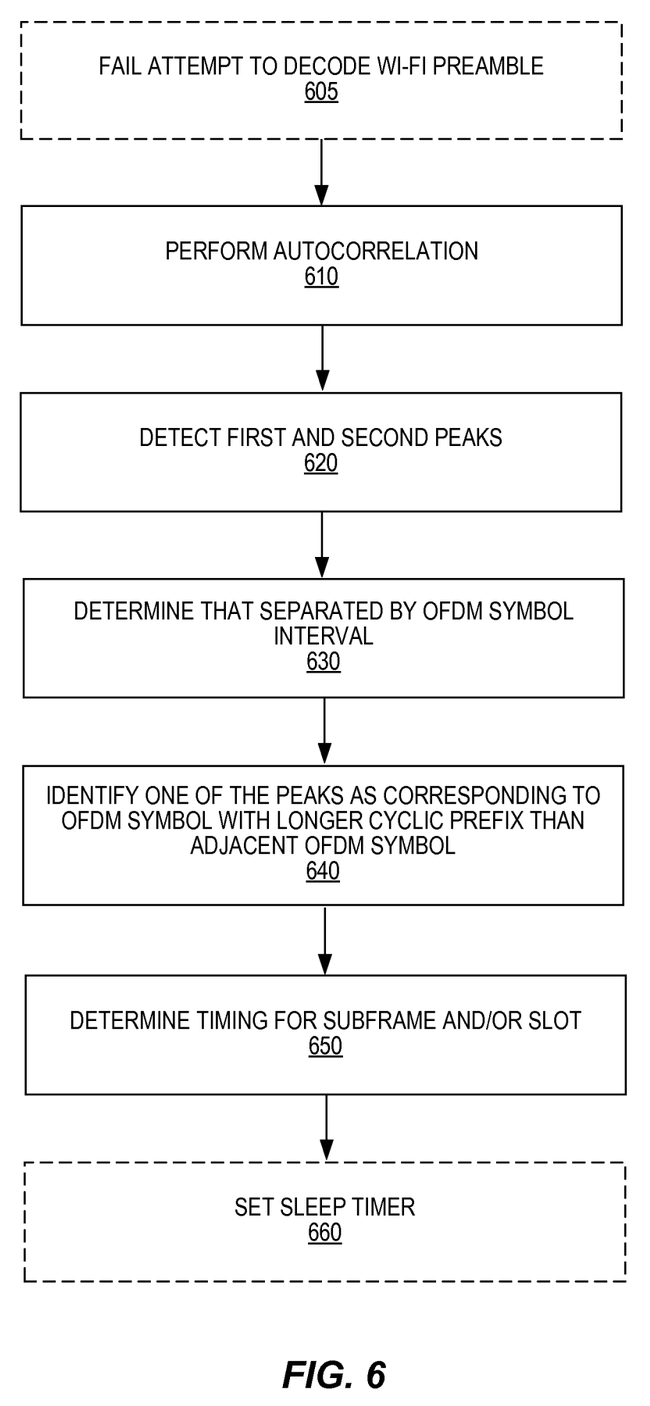
FIG. 6 is a process flow diagram illustrating an example method.

FIG. 6 is a process flow diagram illustrating one example of a method according to the techniques described herein. The method illustrated in FIG. 6, which may be carried out in the receiver circuit 510 of FIG. 5 or receiver circuit 710 of FIG. 7, for example, is for detecting the presence and timing of a subframe and/or slot of an OFDM signal, where each subframe and/or slot of the OFDM signal consists of a plurality of OFDM symbols, and where at least one OFDM symbol in each subframe and/or slot has a different cyclic prefix duration from remaining OFDM symbols in the subframe and/or slot. The method may be carried out in a receiver circuit configured to operate according to one of the IEEE 802.11 protocols. In some embodiments, the method may be used to detect the presence of an LAA transmission from or to an LTE or LTE-Advanced network or a New Radio (5G) transmission.

As shown at block 610, the method includes performing an auto-correlation of a first set of time domain samples of a received signal with a second set of time domain samples of the received signal. The second set of samples is a delayed version of the first set of samples, where the delay is chosen to correspond to the duration of the OFDM symbol excluding the cyclic prefix. The number of terms used in the summation in the correlation is at least as large as the smallest number of samples in a CP in any of the OFDM symbols within a subframe and/or slot. An example of this auto-correlation process was provided in FIG. 4B.

As shown at block 620, the method further includes detecting, based on the auto-correlation, first and second correlation peaks meeting one or more predetermined detection criteria. These predetermined criteria may include, for example, that the peaks exceed a predetermined amplitude, or that the peaks exceed an average "floor" level by a predetermined margin or ratio. Other criteria are possible, with the goal simply being to discriminate peaks in the auto-correlation output from surrounding noise.

As shown at block 630, the method includes determining that the first and second correlation peaks are separated in time by an interval corresponding to an OFDM symbol interval. As discussed above, this indicates the presence of an OFDM symbol. In the LTE context, the first symbol in a slot has a longer cyclic prefix than the others, and its overall length is longer correspondingly. This means that the evaluation of the peak separation in time should take into account that two possible separations, of slightly different length, may be observed.

As shown at block 640, the method further includes identifying, based on the two correlation peaks, one of the correlation peaks as corresponding to an OFDM symbol having a larger cyclic prefix than an adjacent OFDM symbol. This may be done by comparing the amplitudes of the peaks to one another and, optionally, to other observed peaks. This identifying may also include an evaluation of the precise separation between the peaks, as was discussed above. In some embodiments, this identifying step includes an evaluation of both the peak amplitudes and the peak separation.

Finally, as shown at block 650, the method further comprises determining a timing for a subframe and/or slot in the received signal, based on said identifying. This may be done by relating the identified OFDM symbol (having a larger cyclic prefix than its neighbor or neighbors) to a known subframe structure. Thus, for example, since it is known that the first OFDM symbol in each slot of an LTE subframe (when using the "normal" cyclic prefix) is longer than the remaining OFDM symbols, the beginning of the slot can be determined, based on the timing of the autocorrelator peak that corresponds to the OFDM symbol with the longer cyclic prefix.

In subframes as currently specified in LTE, the first and second slots have identical structures. This means that if the detection techniques described above and illustrated in FIG. 6 are initiated in the middle of an ongoing transmission, the wireless device can detect the slot timing, but will not know whether it has detected the first or second slot in a subframe. In other words, while the wireless device will know where the slot boundaries are, but will not know where the subframe boundaries. On the other hand, if the wireless device is "listening" to the channel and performing correlations according to the disclosed techniques when the LTE transmission begins, it will detect the beginning of the first subframe, and thus know the subframe timing as well as the slot timing. In practice, this is likely to be the more common scenario.

Also note that the subframe timing for a given LTE cell will not generally change over time. The timing is controlled by the LTE base station (i.e., an eNB), and is the same for all UEs served by that base station. Thus, once the wireless device has detected the subframe timing for that cell, then the wireless device knows when potential subframes might start. Thus, even if the wireless device subsequently "wakes up" in the middle of a transmission, it will know the subframe timing and thus will know the slot number for a detected slot. However, this situation becomes more complicated if there are multiple unsynchronized LAA cells in the vicinity of the wireless device. In this case, the wireless device might detect a transmitted slot for any of these LAA cells. In some embodiments, the wireless device may be configured to detect, based on the slot timings detected for two (or more) transmissions, that there are multiple unsynchronized cells. The wireless device in some of these embodiments may then store estimated timings for each detected cell, and attempt to match subsequently detected slots against these stored timings, to determine which cell each detected slot belongs to, and thus derive the subframe timing for the transmission.

Variations of the method illustrated in FIG. 6 are possible. For example, in some embodiments, the identifying one of the correlation peaks as corresponding to the OFDM symbol having the larger cyclic prefix is based on a distance in time between the two correlation peaks. In some of these and in other embodiments, the identifying one of the correlation peaks as corresponding to the OFDM symbol having the larger cyclic prefix is based on comparing the amplitudes of the two correlation peaks.

The OFDM signal may be an LTE or LTE-Advanced signal, in some embodiments. However, the techniques described herein are applicable to other OFDM signals that are organized into subframes and/or slots, with one or more of the OFDM symbols in the subframe and/or slot having a cyclic prefix differing from the others.

In some embodiments, the autocorrelation and subsequent steps in FIG. 6 may be triggered by a failure to detect a Wi-Fi preamble in the received signal. This is shown at block 605, which is illustrated with a dashed outline to indicate that it is not applicable to some embodiments, such as embodiments implemented outside of the Wi-Fi context.

In some embodiments, the method further comprises setting a sleep timer based on the identified subframe and/or slot timing and entering a sleep mode regulated by said sleep timer. This is shown at block 660, which is also illustrated with a dashed outline, in this case to indicate that this step is not present in every implementation or instance of the illustrated method. In some embodiments, the setting of the sleep timer is performed so as to wake up the receiver prior to the occurrence, in the next subframe and/or slot of the OFDM signal, of an OFDM symbol corresponding to the OFDM symbol having the larger cyclic prefix. More generally, the setting of the sleep timer may be performed so as to wake up the receiver at a predetermined offset in time, relative to the OFDM symbol having the larger cyclic prefix. This predetermined offset in time may have a duration of less than a subframe interval, in some instances or embodiments—for example, the offset may be selected so that the receiver wakes up for every slot (one-half subframe) of an LTE signal. The example wireless device 500 shown in FIG. 5 includes a sleep control signal regulated by such a sleep timer—as seen in that figure, the sleep control signal may control (i.e., activate and deactivate) all or portions of receiver radio-frequency circuitry and/or analog-to-digital converter circuitry.

Figure 7:
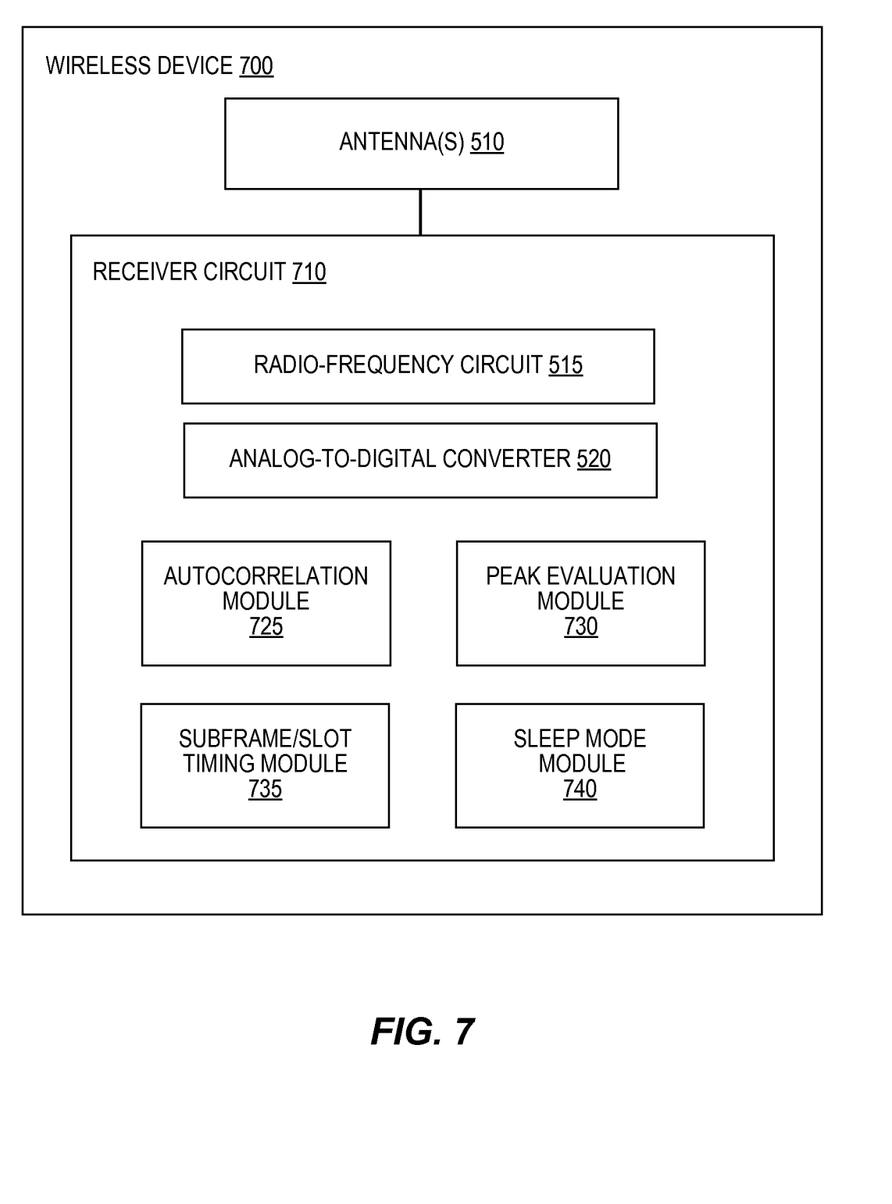
FIG. 7 is another block diagram, illustrating functional modules of an example wireless device.

As discussed above, one or all of the steps shown in FIG. 6 may be implemented with an appropriately programmed processor, or with digital logic or circuit, or with some combination of both. The circuitry configured to carry out these may thus be conceived of as a collection of functional modules, where each module corresponds to digital logic and/or to program code executed by a processor. FIG. 7 thus illustrates an alternative view of a wireless device 700. Like wireless device 500, in FIG. 5, wireless device 700 includes one or more antennas 510, and it also includes a receiver circuit 710. Receiver circuit 710, like the receiver circuit 510 in FIG. 5, includes a radio-frequency circuit 515 and an analog-to-digital converter circuit 520.

Receiver circuit 710 further includes several functional modules, with each corresponding to one or several of the steps shown in FIG. 6. For instance, receiver circuit 710 includes an autocorrelation module 725, for performing an auto-correlation of a first set of time domain samples of a received signal with a second set of time domain samples of the received signal. As discussed above, the second set of samples is a delayed version of the first set of samples, where the delay is chosen to correspond to the duration of the OFDM symbol excluding the cyclic prefix. Again, the number of terms used in the summation in the correlation is at least as large as the smallest number of samples in a CP in any of the OFDM symbols within a subframe and/or slot.

Receiver circuit 710 further includes a peak evaluation module 730, for detecting, based on the auto-correlation, first and second correlation peaks meeting one or more predetermined detection criteria and for determining that the first and second correlation peaks are separated in time by an interval corresponding to an OFDM symbol interval. Receiver circuit 735 still further includes a subframe/slot timing module 735, for identifying, based on the two correlation peaks, one of the correlation peaks as corresponding to an OFDM symbol having a larger cyclic prefix than an adjacent OFDM symbol, and for determining a timing for a subframe and/or slot in the received signal, based on said identifying.

Finally, the example receiver circuit 710 illustrated in FIG. 7 includes a sleep module, which in some embodiments is for setting a sleep timer based on the identified subframe and/or slot timing and entering a sleep mode regulated by said sleep timer. It should be understood that all of the variations discussed above in connection with FIGS. 3, 5 and 6, as well as any other variations discussed herein, may apply to the wireless device 700 of FIG. 7.

Detailed above are methods and corresponding apparatus for detecting the presence and timing of a subframe and/or slot of an OFDM signal, where each subframe and/or slot of the OFDM signal consists of a plurality of OFDM symbols, and where at least one OFDM symbol in each subframe and/or slot has a different cyclic prefix duration from remaining OFDM symbols in the subframe and/or slot. Other embodiments of the presently disclosed techniques include computer program products comprising computer program instructions that, when executed by a processor on a wireless device, cause the wireless device to carry out one or more of the techniques detailed herein. Still other embodiments include computer-readable media, including non-transitory computer-medium, in which one or more such computer program products are stored or conveyed.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a receiver, for detecting the presence and timing of a subframe and/or slot of an Orthogonal Frequency-Division Multiplexing (OFDM) signal comprising subframes and/or slots, each subframe and/or slot consisting of a plurality of OFDM symbols, with at least one OFDM symbol in each subframe and/or slot having a different cyclic prefix (CP) duration from remaining OFDM symbols in the subframe, the method comprising:
   performing an auto-correlation of a first set of time domain samples of a received signal with a second set of time domain samples of the received signal, the second set of samples being a delayed version of the first set of samples where the delay is chosen to correspond to the duration of the OFDM symbol excluding the CP, and where the number of terms used in the summation in the correlation is at least as large as the smallest number of samples in a CP in any of the OFDM symbols within a subframe;
   detecting, based on the auto-correlation, first and second correlation peaks meeting one or more predetermined detection criteria;
   determining that the first and second correlation peaks are separated in time by an interval corresponding to an OFDM symbol interval;
   identifying, based on the two correlation peaks, one of the correlation peaks as corresponding to an OFDM symbol having a larger cyclic prefix than an adjacent OFDM symbol; and
   determining a subframe and/or slot timing for the received signal, based on said identifying.

2. The method of claim 1, wherein the identifying one of the correlation peaks as corresponding to the OFDM symbol having the larger cyclic prefix is based on a distance in time between the two correlation peaks.

3. The method of claim 1, wherein the identifying one of the correlation peaks as corresponding to the OFDM symbol having the larger cyclic prefix is based on comparing the amplitudes of the two correlation peaks.

4. The method of claim 1, wherein the OFDM signal is an LTE or LTE-Advanced signal.

5. The method of claim 1, wherein the receiver is part of a wireless device operating according to an IEEE 802.11 wireless communication protocol.

6. The method of claim 5, wherein the method further comprises, prior to the performing of the auto-correlation, attempting to detect, in the received signal, a preamble defined by the IEEE 802.11 wireless communication protocol, wherein the performing of the auto-correlation is triggered by a failure to detect the preamble in the received signal.

7. The method of claim 1, further comprising setting a sleep timer based on the identified subframe and/or slot timing and entering a sleep mode regulated by said sleep timer.

8. The method of claim 7, wherein setting the sleep timer is performed so as to wake up the receiver prior to the occurrence, in the next subframe and/or slot of the OFDM signal, of an OFDM symbol corresponding to the OFDM symbol having the larger cyclic prefix.

9. The method of claim 7, wherein setting the sleep timer is performed so as to wake up the receiver at a predetermined offset in time, relative to the OFDM symbol having the larger cyclic prefix.

10. The method of claim 9, wherein the predetermined offset in time has a duration of less than a subframe interval.

11. A receiver, for detecting the presence and timing of a subframe and/or slot of an Orthogonal Frequency-Division Multiplexing (OFDM) signal comprising subframes and/or slots, each subframe and/or slot consisting of a plurality of OFDM symbols, with at least one OFDM symbol in each subframe and/or slot having a different cyclic prefix (CP) duration from remaining OFDM symbols in the subframe, the receiver comprising:
   radio-frequency circuitry configured to receive and condition a received radio-frequency signal;
   an analog-to-digital converter circuit configured to sample the conditioned radio-frequency signal, thereby generating time-domain samples of the received signal; and
   a processing circuit configured to:
   perform an auto-correlation of a first set of the time-domain samples with a second set of the time-domain samples, the second set of time-domain samples being a delayed version of the first set of time-domain samples, where the delay is chosen to correspond to the duration of the OFDM symbol excluding the CP, and where the number of terms used in the summation in the correlation is at least as large as the smallest number of samples in a CP in any of the OFDM symbols within a subframe;
   detect, based on the auto-correlation, first and second correlation peaks meeting one or more predetermined detection criteria;
   determine that the first and second correlation peaks are separated in time by an interval corresponding to an OFDM symbol interval;
   identify, based on the two correlation peaks, one of the correlation peaks as corresponding to an OFDM symbol having a larger cyclic prefix than an adjacent OFDM symbol; and
   determine a subframe and/or slot timing for the received signal, based on said identifying.

12. The receiver of claim 11, wherein the processing circuit is configured to identify of the correlation peaks as corresponding to the OFDM symbol having the larger cyclic prefix based on a distance in time between the two correlation peaks.

13. The receiver of claim 11, wherein the processing circuit is configured to identify one of the correlation peaks as corresponding to the OFDM symbol having the larger cyclic prefix is based on comparing the amplitudes of the two correlation peaks.

14. The receiver of claim 11, wherein the OFDM signal is an LTE or LTE-Advanced signal.

15. The receiver of claim 11, wherein the receiver is part of a wireless device operating according to an IEEE 802.11 wireless communication protocol.

16. The receiver of claim 15, wherein the processing circuit is further configured to, prior to performing the auto-correlation, attempt to detect, in the received signal, a preamble defined by the IEEE 802.11 wireless communication protocol, wherein the performing of the auto-correlation is triggered by a failure to detect the preamble in the received signal.

17. The receiver of claim 11, wherein the processing circuit is configured to set a sleep timer based on the identified subframe and/or slot timing and enter a sleep mode regulated by said sleep timer.

18. The receiver of claim 17, wherein the processing circuit is configured to set the sleep timer so as to wake up the receiver prior to the occurrence, in the next subframe and/or slot of the OFDM signal, of an OFDM symbol corresponding to the OFDM symbol having the larger cyclic prefix.

19. The receiver of claim 17, wherein the processing circuit is configured to set the sleep timer so as to wake up the receiver at a predetermined offset in time, relative to the OFDM symbol having the larger cyclic prefix.

20. The receiver of claim 19, wherein the predetermined offset in time has a duration of less than a subframe interval.

* * * * *